United States Patent [19]

Faris

[11] Patent Number: 5,553,203
[45] Date of Patent: Sep. 3, 1996

[54] PIXEL DATA PROCESSING SYSTEM AND METHOD FOR PRODUCING AND GRAPHICALLY PRESENTING SPATIALLY MULTIPLEXED IMAGES OF 3-D OBJECTS FOR STEREOSCOPIC VIEWING THEREOF

[75] Inventor: Sadeg M. Faris, Pleasantville, N.Y.

[73] Assignee: Reveo, Inc., Hawthorne, N.Y.

[21] Appl. No.: 976,518

[22] Filed: Nov. 16, 1992

Related U.S. Application Data

[63] Continuation of Ser. No. 587,664, Sep. 26, 1990, Pat. No. 5,165,013.

[51] Int. Cl.$^6$ ................................................. G06K 15/00
[52] U.S. Cl. ..................................................... 395/115
[58] Field of Search ................................... 395/104, 101, 395/103, 111, 115, 119, 120; 353/8; 352/60, 57, 58; 346/134, 139 R, 139 C, 135.1, 136; 250/558; 356/2

[56] References Cited

U.S. PATENT DOCUMENTS

| | | |
|---|---|---|
| 1,435,520 | 11/1922 | Hammond. |
| 2,099,694 | 3/1934 | Land. |
| 2,301,254 | 11/1942 | Carnahan. |
| 2,417,446 | 3/1947 | Reynolds. |
| 2,571,612 | 10/1951 | Rines. |
| 2,623,433 | 12/1952 | Stipek ........................ 356/2 |
| 2,647,440 | 8/1953 | Rehorn. |

(List continued on next page.)

FOREIGN PATENT DOCUMENTS

| | | |
|---|---|---|
| 5389959 | 3/1980 | Japan. |
| 59264515 | 6/1986 | Japan. |
| 61-59555 | 9/1987 | Japan. |
| 489888 | 8/1937 | United Kingdom. |
| 1523436 | 10/1975 | United Kingdom. |
| 2111798 | 7/1983 | United Kingdom. |
| 2231754 | 11/1990 | United Kingdom. |

OTHER PUBLICATIONS

"Stereoscopic real-time and multiplexed video system" by Lenny Lipton, StereoGraphics Corporation, published in SPIE vol. 1915, Stereoscopic Displays and Applications IV, pp. 6–11, Feb. 1993.

Technical Brochure for the SGS 310, 410, 610 Stereoscopic 3–D Display Kits, published Jun. 1992 from Tektronix Display Products, Beaverton, Oregon.

Article in NASA Tech Briefs, Sep. 1991, pp. 12–13, Describing CrystalEyes® stereo 3–D viewing system from StereoGraphics Corp., San Rapheal, CA.

(List continued on next page.)

*Primary Examiner*—Arthur G. Evans
*Attorney, Agent, or Firm*—Thomas J. Perkowski, Esq.

[57] ABSTRACT

Pixel data processing system and method for producing a spatial multiplexed image of a 3-D object for use in stereoscopic viewing thereof. The pixel data sets of each pair of first and second perspective (e.g. left and right) images of a 3-D object, are stored in a first and second memory arrays. The pixel data sets of the first and second perspective images are processed in accordance with complimentary spatial modulation functions, so as to produce third and fourth pixel data sets representative of first and second spatially modulated images consisting of first and second pixel patterns, respectively. The pixel data sets of the first and second spatially modulated images are stored in third and fourth memory arrays. The pixel data sets of the first and second spatially modulated images are processed in accordance with a spatial multiplexing function, so as to produce a fifth pixel data set representing a spatially multiplexed image (SMI) of the object. The pixel data set of the spatially multiplexed image is stored in a fifth memory array, and is then translated into a set of vector quantities that are used to graphically present (e.g. record or display) the spatially multiplexed image for viewing through an optically transparent micropolarization panel and a pair of passively polarized spectacles.

27 Claims, 8 Drawing Sheets

U.S. PATENT DOCUMENTS

| | | |
|---|---|---|
| 2,949,055 | 7/1954 | Blackstone . |
| 2,983,835 | 5/1961 | Frey . |
| 3,275,745 | 9/1966 | Var . |
| 3,371,324 | 2/1968 | Sinto . |
| 3,507,549 | 4/1970 | Land . |
| 3,653,939 | 5/1972 | Hobrough ................................. 356/2 |
| 3,659,939 | 5/1972 | Hobrough . |
| 3,741,626 | 6/1973 | Wentz . |
| 3,807,831 | 4/1974 | Soret . |
| 3,821,466 | 6/1974 | Roese . |
| 3,858,001 | 12/1974 | Bonne . |
| 3,944,351 | 3/1976 | Ito et al. . |
| 4,122,484 | 10/1978 | Tan . |
| 4,281,341 | 7/1981 | Byatt . |
| 4,286,286 | 8/1981 | Jurosson et al. . |
| 4,431,265 | 2/1984 | Benton . |
| 4,504,856 | 3/1985 | Jackman . |
| 4,523,226 | 6/1985 | Lipton et al. . |
| 4,562,463 | 12/1985 | Lipton . |
| 4,566,758 | 1/1986 | Bos . |
| 4,582,396 | 4/1986 | Bos et al. . |
| 4,583,117 | 4/1986 | Lipton . |
| 4,588,259 | 5/1986 | Sheiman . |
| 4,670,744 | 6/1987 | Buzak . |
| 4,709,263 | 11/1987 | Brumage . |
| 4,719,507 | 1/1988 | Bos . |
| 4,723,159 | 2/1988 | Imsand . |
| 4,746,936 | 5/1988 | Takahoshi ...................... 346/140 R |
| 4,792,850 | 12/1988 | Lipton . |
| 4,873,572 | 10/1989 | Miyuzaki et al. . |
| 4,877,307 | 10/1989 | Kalmanash . |
| 4,943,852 | 7/1990 | Femano et al. . |
| 4,984,179 | 1/1991 | Waldern . |
| 4,995,718 | 2/1991 | Jachimonowicz et al. . |
| 5,007,715 | 4/1991 | Verhulst . |
| 5,113,285 | 5/1992 | Franklin . |
| 5,165,013 | 11/1992 | Faris ..................................... 395/104 |

OTHER PUBLICATIONS

"Large Screen Electro–stereoscopic Displays" by Lenny Lipton, published in SPIE vol. 1255 Large–Screen Projection Display II, pp. 108–113, Feb. 1990.

"Field–sequential Electronic Stereoscopic Projector" by Lenny Lipton, published in SPIE vol. 1081 Projection Display Technology Systems and Applications, pp. 94–100, Jan. 1989.

"Compatability of Stereoscopic Video Systems with Broadcast Television Standards" by Lenny Lipton, published in SPIE vol. 1083 Three–Dimensional Visualization and Display Technologies, pp. 95–101, 1989.

"Field–Sequential Stereoscopic Viewing Systems Using Passive Glasses" by Bos, et al., published in Proceedings of the SID, vol. 30, No. 1, pp. 39–43, 1989.

"A Real–time Autostereoscopic Multiplanar 3D Display System" by Rodney Williams, et al. of Texas Instruments, Inc., published in SID 88 DIGEST, pp. 91–94, 1988.

"High–Performance 3D Viewing Systems Using Passive Glasses", by Philip Bos, published in SID 88 DIGEST, pp. 450–453, 1988.

"Experience with Stereoscopic Devices and Output Algorithms" by James S. Lipscomb, published in SPIE vol. 1083 Three–Dimensional Visualization and Display Technologies, pp. 28–34, 1989.

"3–D Comes Home" by Tom Waters, published in Discover, May 1988, pp. 30–32.

"Circular Polarization Image Selection for Timeplex Stereoscopic Video Devices" by Lenny Lipton, Stereographics Corporation, published in SPIE vol. 779 Display System Optics, May 1987, pp. 41–44.

"Three–dimensional TV with cordless FLC Spectacles" by W. J. Hartmann et al., published in Information Display, vol. 10, 1987, pp. 15–17.

"Holographic Display of Three–Dimensional Images" by Larry Hodges et al., published in Information Display, vol. 10, 1987, pp. 8–11.

"Hard copy for true three–dimensional images" by Larry Hodges, et al., published Information Display, vol.9, 1987, pp. 12–15,25.

"True three–dimensional CRT–based displays" by Larry Hodges, et al., published in Information Display, vol.5, 1987, pp. 18–22.

"Holographic Micropatterns and the Ordering of Photographic Grains in Film Systems"(Abstract) by James Cowan, et al., published in ACTA Polytechnica Scandinavica, Applied Physics Series No. 149, Proceedings of Image Science '85. vol.1, Jun. 1985.

"Three–dimensional Projection with Circular Polarizers" by Vivian Walworth, et al., published by SPIE vol. 462 Optics in Entertainment II, Jan. 1984, pp. 64–68.

"Varifocal Mirror Techniques for Video Transmission of Three–Dimensional Images" by M. C. King, et al., published in Applied Optics, vol.9, No. 9, Sep. 1970, pp. 2035–2039.

Section 14.6.3 Dichroic Polarizers (pp. 716–718), in Principles of Optics (Fourth Edition) 1970, by Max Born and Emil Wolf, published by Pergamon Press, Oxford.

"A New Approach to Computer–Generated Holography" by M. C. King et al., published in Applied Optics, vol.9, No. 2, Feb. 1970, pp. 471–475.

Chapter 10, Section10.1 Introduction to Polarized Light, Section 10.2 Methods of Producing Polarized Light, and Section 10.3 The Transverse Nature of Light (pp. 485–520), in Optics by Miles V. Klein, published by John Wiley & Sons, Inc. New York.

Chapter 8, Polarization pp. 394–450, in Waves: Berkeley Physics Course–vol. 3, by Frank S. Crawfrod, Jr.

"Low–Cost 3–D TV" in Electronics (Edited by Alexander A. McKenzie), Jul. 1953, at p. 1996.

Proposal entitled "3–D Flat Panel Color Display PRDA 89–9 Technical/Management and Cost" prepared for Directorate of R&D Contracting ASD/PMRNB, Wright–Patterson AFB, Ohio, by Honeywell, Inc. Systems and Research Center, Phoenix Technology Center, Aug. 1989.

1993 Product Brochure entitled "Professional Products" from the 3D TV Corporation, of San Rafael, California (10 pages).

PIXEL DATA PROCESSING SYSTEM AND METHOD FOR PRODUCING AND GRAPHICALLY PRESENTING SPATIALLY MULTIPLEXED IMAGES OF 3-D OBJECTS FOR STEREOSCOPIC VIEWING THEREOF

This is a continuation application of a application Ser. No. 07/587,664 entitled "3-D Stereo Pen Plotter" filed Sep. 26, 1990, now U.S. Pat. No. 5,165,013 which is incorporated herein by reference as if fully set forth herein.

BACKGROUND OF THE INVENTION

1. Field of the Invention

This invention relates in general to the field of computer hard copy output devices. In particular it relates to pen plotters used to provide hardcopies for computer aided design, drafting and graphics.

2. Description of Related Art

All living creatures are endowed with a pair of eyes for 3-D stereoscopic vision. They have depended on this vision for their survival. Yet, in spite of the tremendous advances in information technology, there is no prior art teaching how to obtain hardcopy outputs from computers in the form of 3-D stereo plots. U.S. Pat. No. 5,121,343 teaches methods for producing 3-D stereo computer printers based on the micro-polarizer arrays and spatial multiplexing principles described in my co-pending applications Ser. No. 7/536,190, and Ser. No. 7/536,419 which are incorporated herein by reference. However, because pen plotters depend on the continuous transfer of ink from the pen onto the paper, the 3-D stereo printer operating principles described in Ser. No. 7/554,742 will not work for pen plotters. Therefore, there remains a need for generating large 3-D sterno plots for architectural and mechanical designs for which pen plotters are particularly suited.

SUMMARY OF THE INVENTION

The principal object of the present invention is to provide a 3-D stereo pen plotter which is based on micro-polarizer arrays (μPol) and spatial multiplexing. It comprises:

Means for manufacturing a special plotting paper having self-aligned features of the spatially multiplexed image with respect to the μPol. This plotting paper is based on the fact that water and oil do not mix and on the use of hydrophobic and hydrophilic coatings; and Novel pen design which, even though continuously presses on the plotting paper, it plots only in the space intended for one perspective image, while skipping the space of the other perspective, to be filled with a different pen.

DETAILED DESCRIPTION OF THE PREFERRED EMBODIMENTS

Figure 1A:
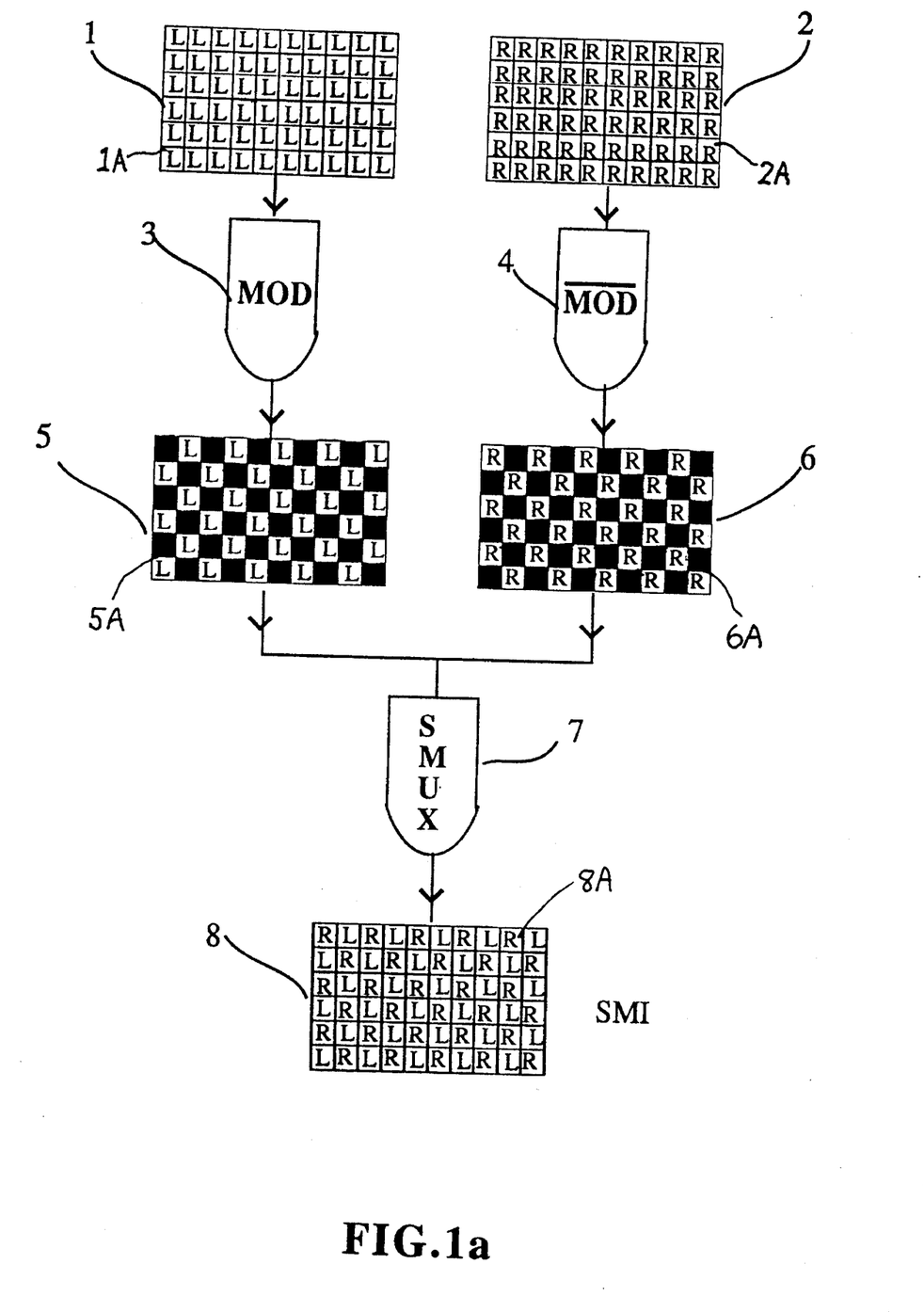
FIG. 1a illustrates the principles behind the stereo plotter, spatial modulation and spatial multiplexing of the left and right images.
Figure 1B:
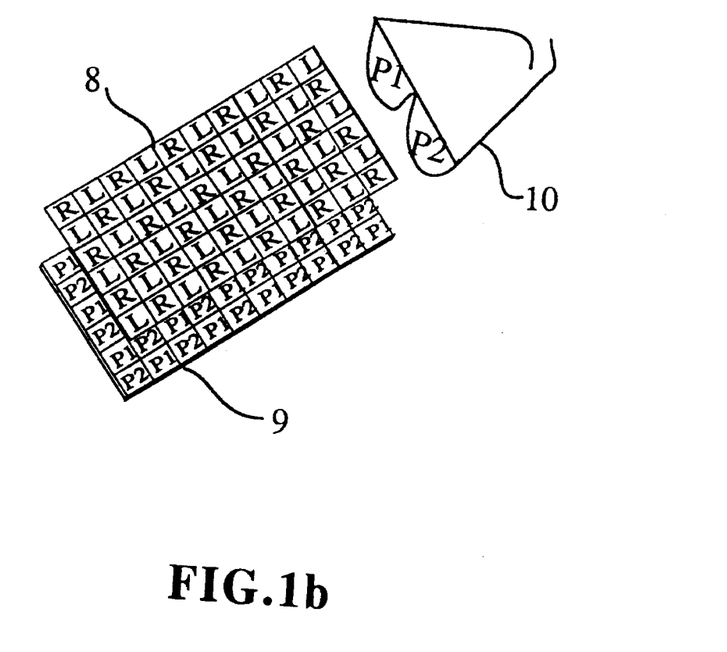
FIGS. 1b and 1c illustrate the use of micropolarizer sheets for demultiplexing and stereo viewing of the printed image by means of polarized spectacles.
Figure 1C:
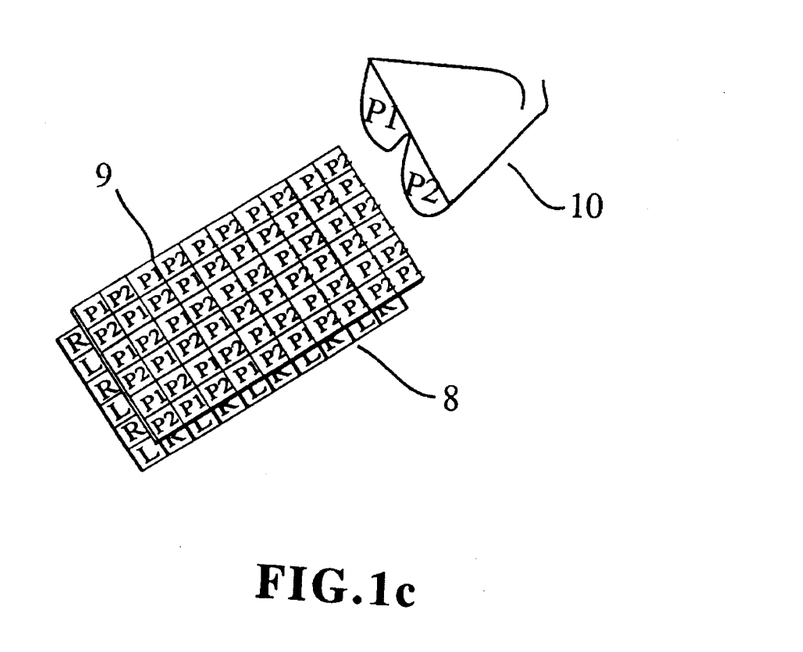

The invention is based on two fundamentally new concepts combined for the first time to record and display 3-D images. They are: Spatial Multiplexing of left and right images and Micro-Polarizers. These are described in my co-pending applications: "A System For Producing 3-D Stereo Images", Ser. No. 536-190, and "Methods For Manufacturing Micropolarizers", Ser. No. 536-419. FIG. 1a illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore caries the stereo information. The flow diagram of FIG. 1a is an algorithm to produce the SMI which can be implemented either in hardware or in software. In FIG. 1b the SMI 8 is combined with a spatial demultiplexer 9, a micropolarizer, μPol sheet described in applications Ser. No. 536-190, and Ser. No. 536-419 and a polarization decoder 10, a pair of spectacles with polarization states P1 and P2. The SMI and the μPol arrays 9 which have the same period are aligned such that the left pixels in the SMI illuminate the P2 cells in the μPol array and the right pixels illuminate the P1 cells. Thus, the left pixels become P2 polarized and the right pixels become P1 polarized. Because of the discriminating ability of the polarized eye glasses, tile left eye which has a P2 polarizer can seen only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the μPol. Choosing between the configurations of FIG. 1b and FIG. 1c depends on how the SMI is illuminated, and whether the transmissive mode or reflective mode of display is used; see Ser. No. 536-190.

Figure 2A:
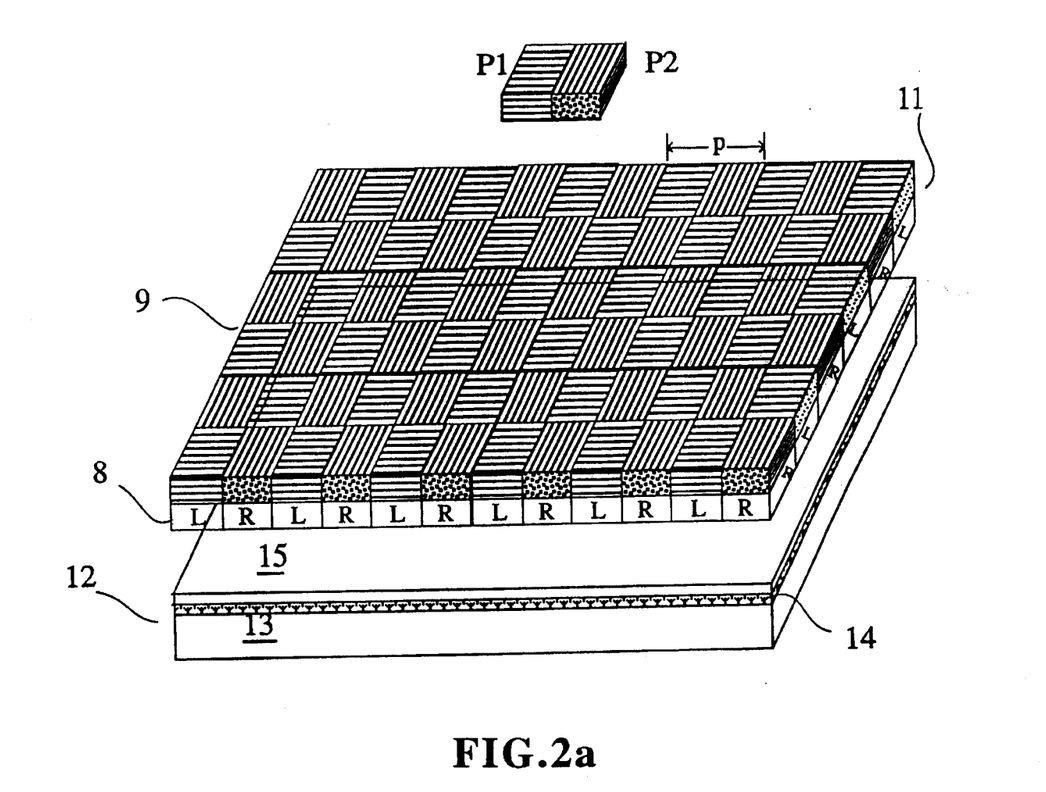
FIGS. 2a–c show the 3-D stereo plot made of laminating a plotted micropolarizer sheet with a polarization preserving aluminum coated paper.
Figure 2B:
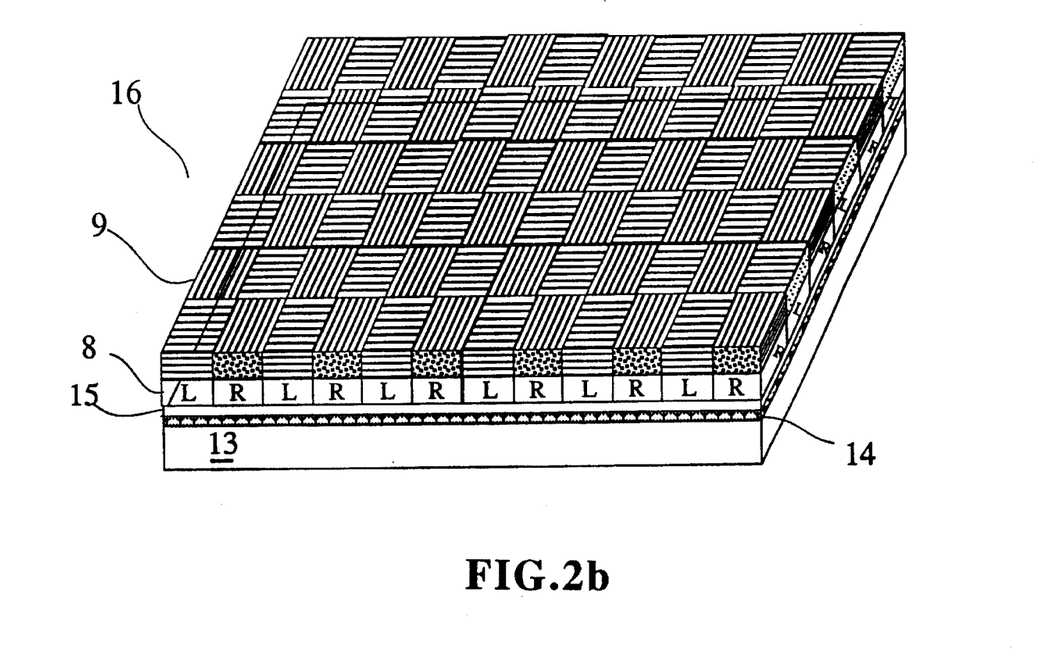
Figure 2C:
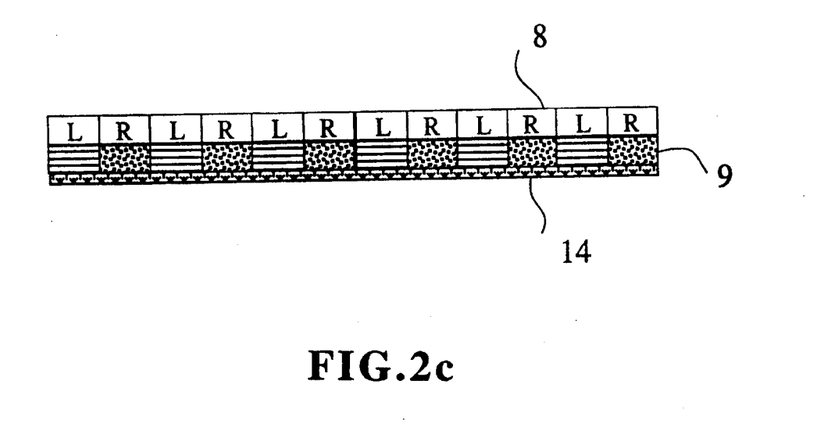

To build a hardcopy plotter to output images from computers in stereo the above concept is used in conjunction with the principles taught in the embodiments described here. FIGS. 2a and 2b show how the final desired hardcopy stereo output is obtained. It comprises two sheets 11 and 12 laminated together to produce the output plot 16. The first sheet 11 is a μPol 9 on which the SMI 8 is plotted after proper alignment is ensured. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the μPol layer its brightness is reduced by at least 50%. FIG. 2c shows another simpler embodiment which eliminates the sheet 12 but achieves the same result by directly coating the back of the μPol 9 with a silver or aluminum film 14. There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funfschilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the μPols in Ser. No. 536-190, and Ser. No. 536-419 belongs to the absorptive class. Hard copies based on the absorptive class, in general, lose at least 50% of the illuminating light. The reflective class separates the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2 light is then reflected by the metallic layer and converted into P1 (it is well known in the field of optics that a circularly polarized light of one state is converted to the orthogonal state as a result of reflection), thus all the incident light is converted to polarized light of state P1. This reflective class of polarizers when used to fabricate μPols, provides at least a factor of 2 brighter 3-D stereo plots than the absorptive class.

Figure 3:
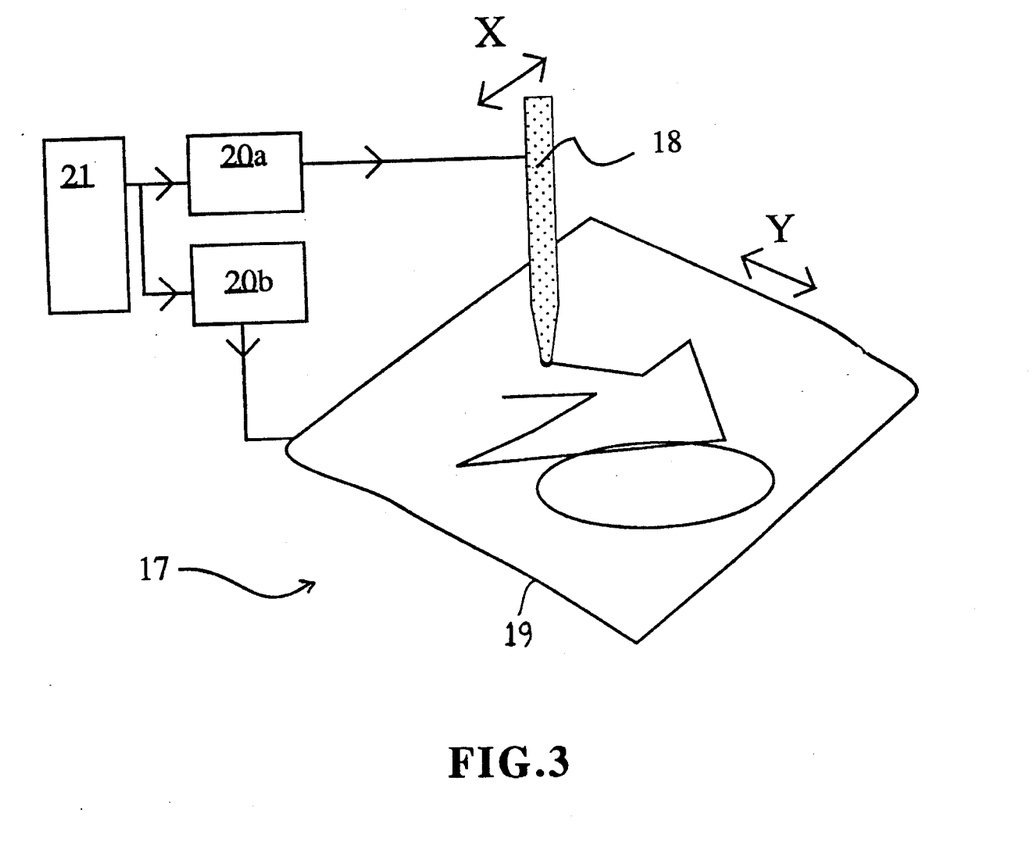
FIG. 3 shows the schematically the components of a pen plotter.

FIG. 3 illustrates schematically a pen plotter 17. Its main components are: the pen 18 which can be moved in the positive and negative X directions by means of an electromechanical X motion controller 20a; the paper 19 which can be moved in the positive and negative Y directions by means of an electromechanical Y motion controller 20b, and the computer 21. The computer translates the image to be plotted to vector quantities, and supplying the X and Y coordinates to the X and Y motion controllers relative to an initial position. Typical plotters also include a pen cartridge which holds 8 pens of different colors each of which is activated in turn for plotting. The main advantage of plotters over printers, is their ability to produce extremely wide and long plots. However, because conventional pen plotting is based on continuous ink transfer from an initial potion to a final position, spatial multiplexing of images is not possible unless a "pixel skipping pen" is found.

Figure 4A:
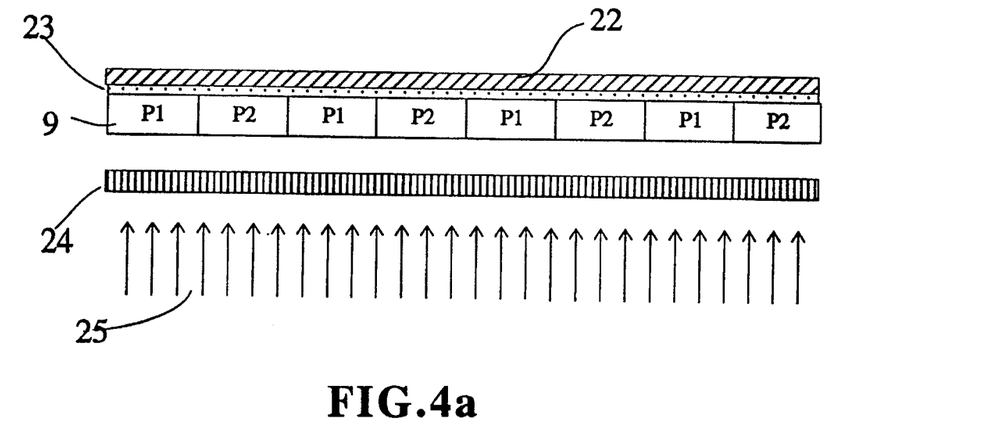
FIGS. 4a–c illustrate the manufacturing steps for producing a self-aligned μPol plotting paper.
Figure 4B:
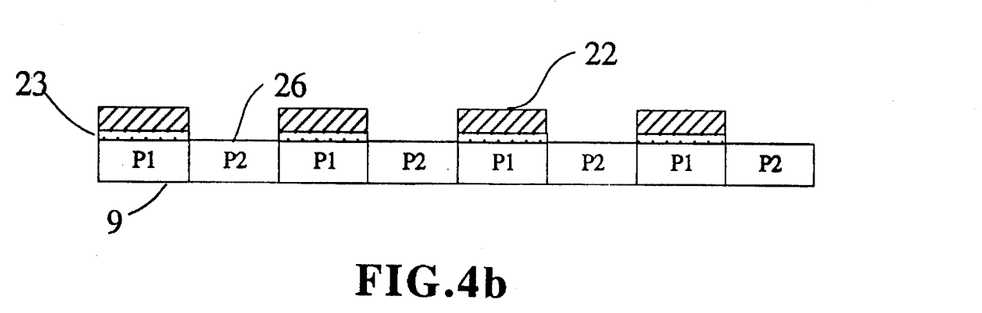
Figure 4C:
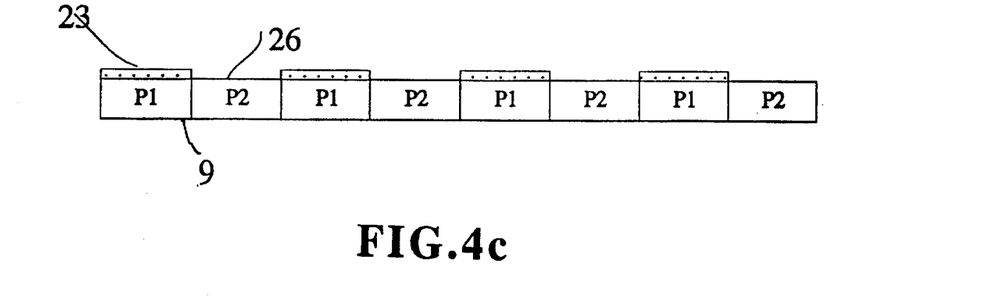
Figure 5:
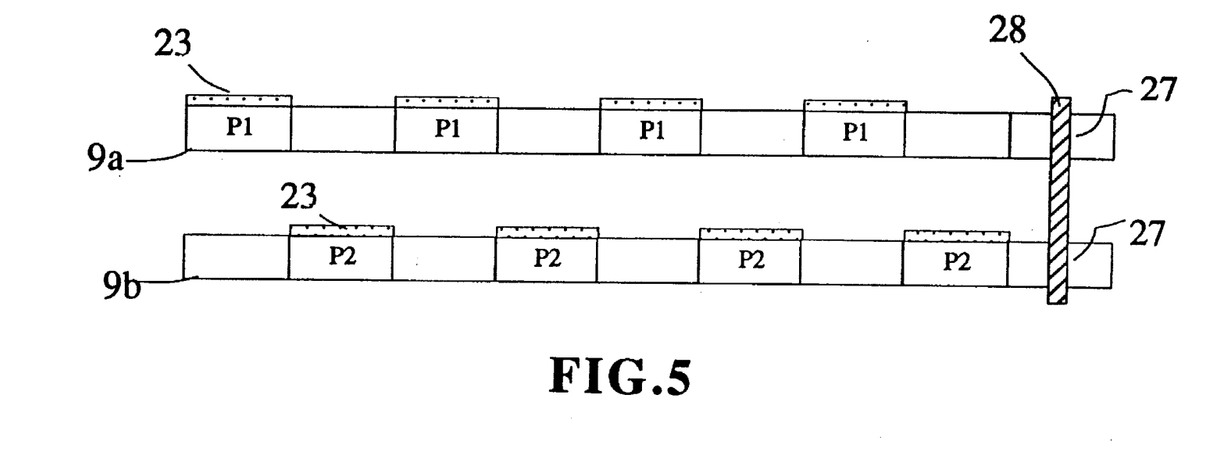
FIG. 5 shows another plotting paper embodiment which is based on 2 components and registration pins.
Figure 6:
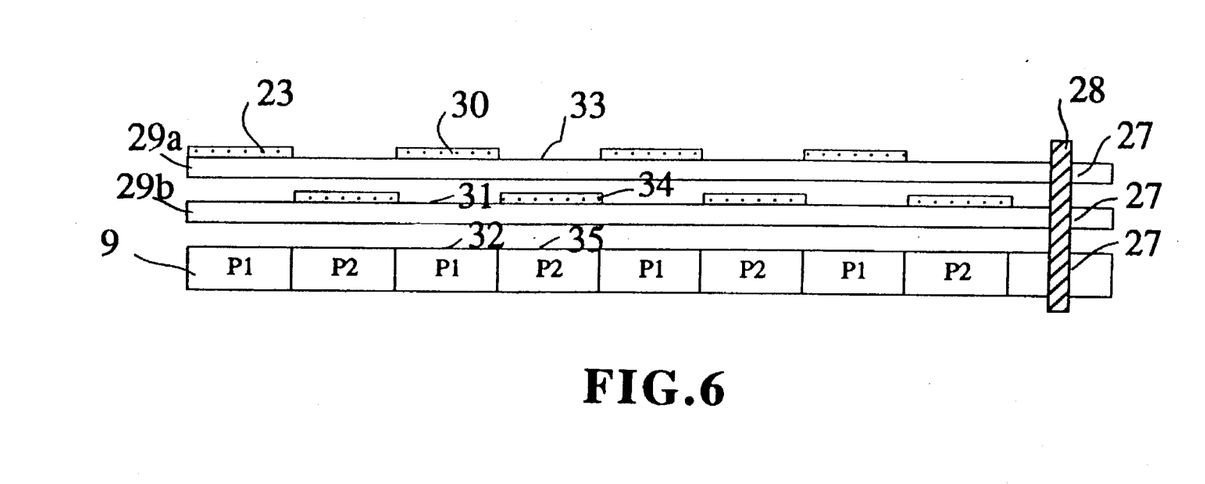
FIG. 6 shows a third plotting paper embodiment which is based on 3 components and registration pins.

The "pixel skipping pen" concept is implemented by means of a special plotting paper manufactured according to the self-aligned process shown in FIG. 4. The μPol sheet 9 (FIG. 4a) is coated with a hydrophobic layer 23 (an oil based coating which repels water, similar to the coating used in making offset printing plates) and a photoresist layer 22. The laminate is exposed with a light source 25 through a sheet polarizer 24 with polarization state P2. The photoresist covering the P1 parts of the μPol 9 are not exposed by the P2 polarized light because the P1 parts do not transmit the P2 state. On the other hand the photoresist covering the P2 parts of the μPol 9 are exposed by the P2 polarized light because the P2 parts do transmit the P2 state. The next step FIG. 4b, is to develop the photoresist and chemically etch away the hydrophobic coating 23, leaving the P2 parts 26 of μPol 9 exposed. These exposed parts are hydrophilic, i.e., they attract water. The final step FIG. 4c is the removal of the photoresist, producing the final 3-D plotting paper. FIG. 5 shows a second method for producing a 3-D plotting paper using two components 9a and 9b. These components are registered by means of registrations pins 28 going through the registration holes 27. The pins and holes are located in a least two locations in both 9a and 9b. The patterning of the coating 23 on 9a is accomplished by the same self-alignment method described in FIG. 4. The patterning of the coating 23 on 9a is also accomplished by the same self-alignment method described in FIG. 4, except for replacing the sheet polarizer P2 with a sheet polarizer P1. FIG. 6 shows yet a third method for producing a 3-D plotting paper using three components: clear plastic films 29a, 29b, and a μPol sheet 9. These components are registered by means of registrations pins 28 going through the registration holes 27. The pins and holes are located in a least two locations in 9, 29a, and 29b. The patterning of the coating 23 on 29a is accomplished by the same self-alignment method described in FIG. 4. The patterning of the coating 23 on 29b is also accomplished by the same self-alignment method described in FIG. 4 except for replacing the sheet polarizer P2 with a sheet polarizer P1.

Figure 7A:
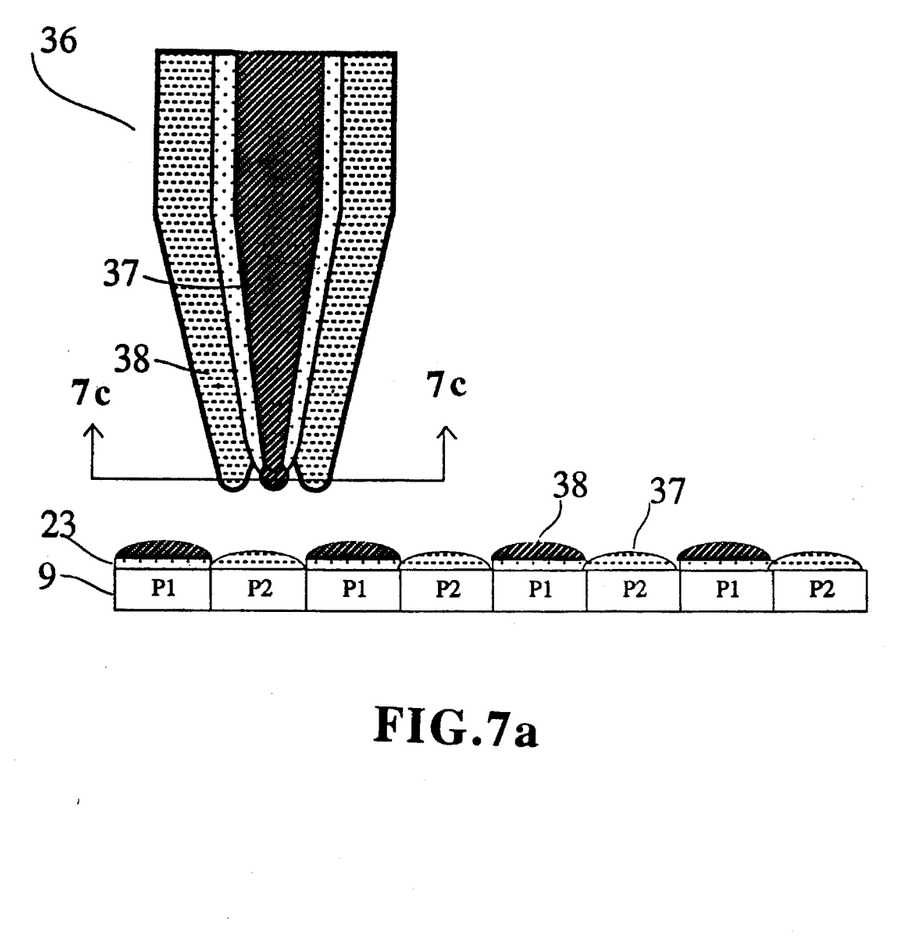
FIGS. 7a–c illustrate the special "pixel skipping" pens and their use in producing plots on a single component μPol 3-D plotting paper.
Figure 7B:
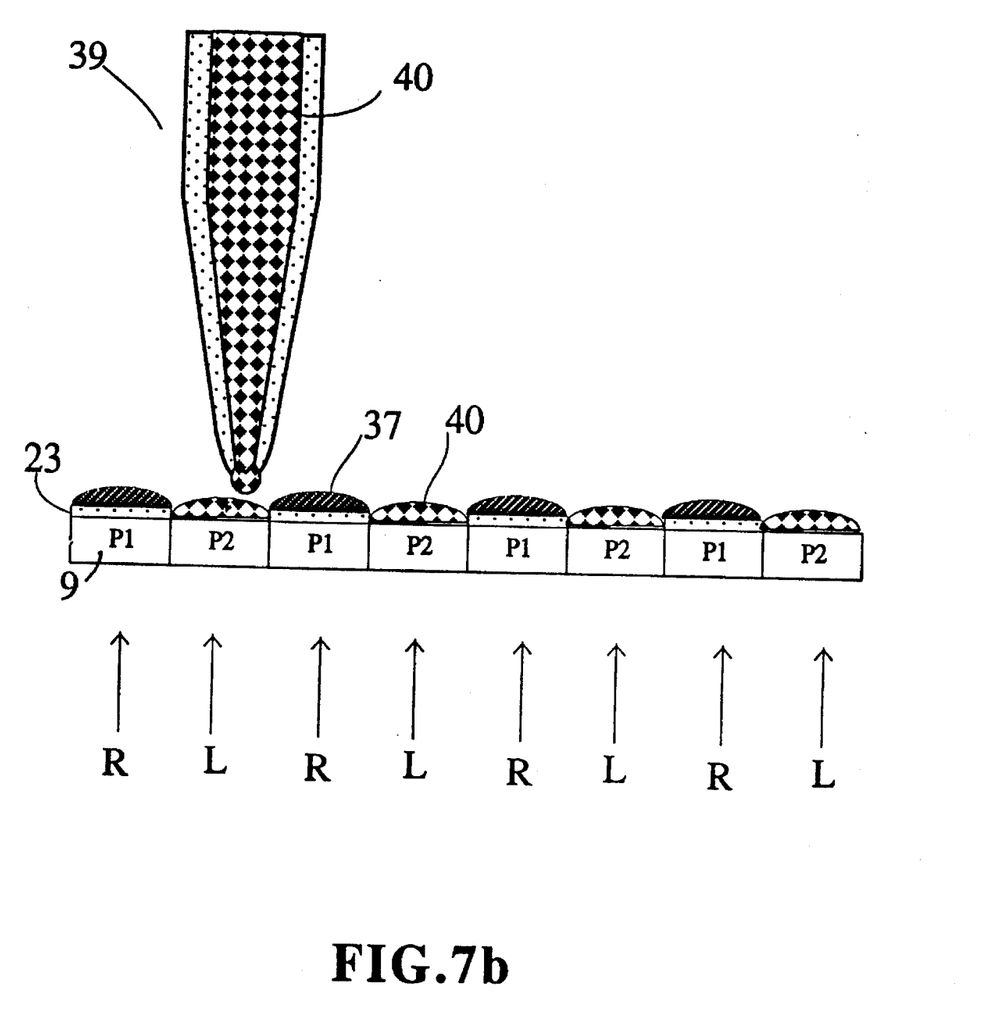
Figure 7C:
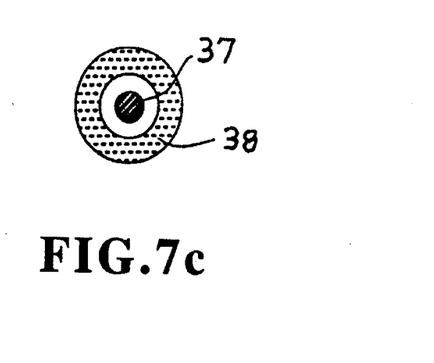

3-D stereo plotting is demonstrated in FIG. 7a, using the single component plotting paper produced by the process described in FIG. 4, and a special pen design 36. The pen 36 has an oil-based ink 37 surrounded by a clear water based liquid 38. The purpose of the water-based liquid is to wet the hydrophilic regions on the P2 parts of μPol 9 before they are contacted by the center oil-based ink 37, making the water-wetted P2 parts forbidden to the oil ink. In the mean time, the coating 23 covering the P1 parts is hydrophobic, it repels the water-based liquid 38 and attracts the oil-based ink 37. The overall result is a pen that plots the P1 parts and skips the P2 parts. In order to achieve spatial multiplexing, the oil-based "pixel skipping pen" 36 plots only the right image on the P1 parts. In FIG. 7b, another water-based ink pen 39 is used to plot the left image only on the hydrophilic P2 parts while skipping the hydrophobic P1 pixels. Thus spatial multiplexing of the left and right perspectives is completed using pen plotting with automatic registration.

The second and third 3-D plotting papers in FIG. 5 and FIG. 6 do not require the special pen 36, instead, they use regular pens with either water-based inks or oil-based-inks. However, in this case plotting one perspective requires the removal of one layer, and then putting it back for plotting the second perspective. The registration pins 28 ensure proper alignment all the time.

What is claimed is:

1. A pixel data processing system for producing a spatial multiplexed image of a 3-D object for use in stereoscopic viewing thereof, comprising:

first pixel data storage means for storing a first pixel data set representing a first perspective image of said object;

second pixel data storage means for storing a second pixel data set representing a second perspective image of said object;

first pixel data processing means for processing said first pixel data set according to a first spatial modulation pattern so as to produce a third pixel data set representing a first spatially modulated image of said object consisting of a first pixel pattern;

third pixel data storage means for storing said third pixel data set representing said first spatially modulated image;

second pixel data processing means for processing said second pixel data set according to a second spatial modulation pattern so as to produce a fourth pixel data set representing a second perspective image of said object consisting of a second pixel pattern, wherein said second spatial modulation pattern is the compliment pattern of said first spatial modulation pattern;

fourth pixel data storage means for storing said fourth pixel data set representing said second spatially modulated image;

third pixel data processing means for processing said third and fourth pixel data sets so as to produce a fifth pixel data set representing a spatially multiplexed image of said object composed of said first and second pixel patterns; and fifth pixel data storage means for storing said fifth pixel data set representing said spatially multiplexed image for use in graphically presenting said spatially multiplexed image and stereoscopic viewing of said object.

2. The pixel data processing system of claim 1, wherein said first pixel data storage means comprises a first memory array for storing said first pixel data set, wherein said pixel second data storage means comprises a second memory array for storing said second pixel data set, wherein said third pixel data storage means comprises a third memory array for storing said third pixel data set, wherein said fourth pixel data storage means comprises a fourth memory array for storing said fourth pixel data set, and wherein said fifth pixel data storage means comprises a fifth memory array for storing said fifth pixel data set.

3. The pixel data processing system of claim 2, wherein said first spatial modulation pattern is a first checkerboard pattern, and said second spatial modulation pattern is a second checkerboard pattern that is the compliment of said first checkerboard pattern.

4. The pixel data processing system of claim 1, wherein said first and second pixel data sets are each arranged in bit map format.

5. The pixel data processing system of claim 1, wherein each pixel in said first and second pixel data sets comprises a plurality of bits representative of color and gray-scale information.

6. The pixel data processing system of claim 1, which further comprises data translation means for translating said fifth pixel data set into a set of vector quantities for use in graphically presenting said spatially multiplexed image for viewing through an optically transparent polarization sheet having first and second polarization patterns permanently formed therein, wherein said first polarization pattern corresponds to and is spatially aligned with said first pixel pattern so as to impart a first polarization state P1 to said first pixel pattern, and wherein said second polarization pattern corresponds to and is spatially aligned with said second pixel pattern so as to impart a second polarization state P2 to said second pixel pattern, such that said second polarization pattern is different than said first polarization P1.

7. The pixel data processing system of claim 6, wherein said set of vector quantities comprises a set of x and y coordinates.

8. A pixel data processing system for producing and displaying a spatial multiplexed image of a 3-D object for use in stereoscopic viewing thereof, comprising:

first pixel data storage means for storing a first pixel data set representing a first perspective image of said object;

second pixel data storage means for storing a second pixel data set representing a second perspective image of said object;

first pixel data processing means for processing said first pixel data set according to a first spatial modulation pattern so as to produce a third pixel data set representing a first spatially modulated image of said object consisting of a first pixel pattern;

third pixel data storage means for storing said third pixel data set representing said first spatially modulated image;

second pixel data processing means for processing said second pixel data set according to a second spatial modulation pattern so as to produce a fourth pixel data set representing a second perspective image of said object consisting of a second pixel pattern, wherein said second spatial modulation pattern is the compliment pattern of said first spatial modulation pattern;

fourth pixel data storage means for storing said fourth pixel data set representing said second spatially modulated image;

third pixel data processing means for processing said third and fourth pixel data sets so as to produce a fifth pixel data set representing a spatially multiplexed image of said object composed of said first and second pixel patterns; and fifth pixel data storage means for storing said fifth pixel data set representing said spatially multiplexed image for use in stereoscopic viewing of said object;

data translation means for translating said fifth pixel data set into a set of vector quantities; and graphical presentation means responsive to said set of vector quantities, for graphically presenting said spatially multiplexed image for viewing through an optically transparent polarization sheet having first and second polarization patterns permanently formed therein, wherein said first polarization pattern corresponds to and is spatially aligned with said first pixel pattern so as to impart a first polarization state P1 to said first pixel pattern, and wherein said second polarization pattern corresponds to and is spatially aligned with said second pixel pattern so as to impart a second polarization state P2 to said second pixel pattern, such that said second polarization pattern is different than said first polarization P1.

9. The pixel data processing system of claim 8, wherein said first polarization state is a first linear polarization state, and wherein said second polarization state P2 is a second linear polarization state, which is orthogonal to said first linear polarization state P1.

10. The pixel data processing system of claim 8, wherein said first polarization state is a first circular polarization state, and wherein said second polarization state P2 is a second circular polarization state, which is orthogonal to said first circular polarization state P1.

11. The pixel data processing system of claim 8, which further comprises an optical viewing device having a first optically transparent element positionable adjacent the left eye of a viewer, and a second optically transparent element positionable adjacent to the right eye of the viewer, wherein said first optically transparent element is characterized by said first polarization state P1 so as to permit only the left eye of the viewer view said first pixel pattern displayed through said optically transparent polarization sheet, while substantially preventing the right eye of the viewer from viewing said second pixel pattern displayed through said optically transparent polarization sheet, and wherein said second optically transparent element is characterized by said second polarization state P2 so as to permit the right eye of the viewer view said second pixel pattern displayed through said optically transparent polarization sheet, while substantially preventing the left eye of the viewer from viewing said first pixel pattern displayed through said optically transparent polarization sheet, whereby the viewer is capable of stereoscopically viewing said 3-D object.

12. The pixel data processing system of claim 9, wherein said first and second optically transparent elements are mounted within a frame supportable on the head of the viewer.

13. The pixel data processing system of claim 6, wherein said graphical presentation means comprises a pen plotter having electro-mechanically controlled means, responsive to said set of vector quantities, for graphically recording said spatially multiplexed image on said optically transparent polarization sheet.

14. The pixel data processing system of claim 11, which further comprises an optical viewing device having a first optically transparent element positionable adjacent the left eye of a viewer, and a second optically transparent element positionable adjacent to the right eye of the viewer, wherein said first optically transparent element is characterized by said first polarization state P1 so as to permit only the left eye of the viewer view said first pixel pattern displayed through said optically transparent polarization sheet, while substantially preventing the right eye of the viewer from viewing said second pixel pattern displayed through said optically transparent polarization sheet, and wherein said second optically transparent element is characterized by said second polarization state P2 so as to permit the right eye of the viewer view said second pixel pattern displayed through said optically transparent polarization sheet, while substantially preventing the left eye of the viewer from viewing said first pixel pattern displayed through said optically transparent polarization sheet, whereby the viewer is capable of stereoscopically viewing said 3-D object.

15. The pixel data processing system of claim 6, wherein said graphical presentation means comprises a pen plotter having electro-mechanically controlled means, responsive to said set of vector quantities, for graphically recording said spatially multiplexed image on a recording sheet over which said optically transparent polarization sheet is affixed so that said first polarization pattern corresponds to and is spatially aligned with said first pixel pattern so as to impart a first polarization state P1 to said first pixel pattern, and said second polarization pattern corresponds to and is spatially aligned with said second pixel pattern so as to impart a second polarization state P2 to said second pixel pattern.

16. The system of claim 13, which further comprises an optical viewing device having a first optically transparent element positionable adjacent the left eye of a viewer, and a second optically transparent element positionable adjacent to the right eye of the viewer, wherein said first optically transparent element is characterized by said first polarization state P1 so as to permit only the left eye of the viewer view said first pixel pattern displayed through said optically transparent polarization sheet, while substantially preventing the right eye of the viewer from viewing said second pixel pattern displayed through said optically transparent polarization sheet, and wherein said second optically transparent element is characterized by said second polarization state P2 so as to permit the right eye of the viewer view said second pixel pattern displayed through said optically transparent polarization sheet, while substantially preventing the left eye of the viewer from viewing said first pixel pattern displayed through said optically transparent polarization sheet, whereby the viewer is capable of stereoscopically viewing said 3-D object.

17. The pixel data processing system of claim 6, wherein said first pixel data storage means comprises a first memory array for storing said first pixel data set, wherein said pixel second data storage means comprises a second memory array for storing said second pixel data set, wherein said third pixel data storage means comprises a third memory array for storing said third pixel data set, wherein said fourth pixel data storage means comprises a fourth memory array for storing said fourth pixel data set, and wherein said fifth pixel data storage means comprises a fifth memory array for storing said fifth pixel data set.

18. The pixel data processing system of claim 6, wherein said first spatial modulation pattern is a first checkerboard pattern, and said second spatial modulation pattern is a second checkerboard pattern that is the compliment of said first checkerboard pattern.

19. The pixel data processing system of claim 6, wherein said first and second pixel data sets are each arranged in bit map format.

20. The pixel data processing system of claim 6, wherein each pixel in said first and second pixel data sets comprises a plurality of bits representative of color and gray-scale information.

21. The pixel data processing system of claim 6, wherein said set of vector quantities comprises a set of x and y coordinates.

22. An method of processing the pixel data sets of first and second perspective images of a 3-D object so as to produce a spatial multiplexed image of said 3-D object for use in stereoscopic viewing thereof, said method comprising the sequence of steps:

(a) storing in a first pixel data storage means, a first pixel data set representing a first perspective image of said object;

(b) storing in a second pixel data storage means, a second pixel data set representing a second perspective image of said object;

(c) processing said first pixel data set according to a first spatial modulation pattern so as to produce a third pixel data set representing a first spatially modulated image of said object consisting of a first pixel pattern;

(d) storing in a third pixel data storage means, said third pixel data set representing said first spatially modulated image;

(e) processing said second pixel data set according to a second spatial modulation pattern so as to produce a fourth pixel data set representing a second perspective image of said object consisting of a second pixel pattern, wherein said second spatial modulation pattern is the compliment pattern of said first spatial modulation pattern;

(f) storing in a fourth pixel data storage means, said fourth pixel data set representing said second spatially modulated image;

(g) processing said third and fourth pixel data sets so as to produce a fifth pixel data set representing a spatially multiplexed image of said object composed of said first and second pixel patterns; and (h) storing in a fifth pixel data storage means, said fifth pixel data set representing said spatially multiplexed image, for use in graphically presenting said spatially multiplexed image and stereoscopic viewing of said object.

23. The method of claim 20, where in step (e) said first spatial modulation pattern resembles a first checkerboard pattern, and where in step (g) said second spatial modulation pattern resembles a second checkerboard pattern that is the compliment of said first checkerboard pattern.

24. The method of claim 20, wherein said first and second pixel data sets are arranged in bit map format.

25. The method of claim 20, wherein each pixel in said first and second pixel data sets comprises a plurality of bits representative of color and gray-scale information.

26. The method of claim 20, which further comprises translating said fifth pixel data set into a set of vector quantities for use in graphically presenting said spatially multiplexed image for viewing through an optically transparent polarization sheet having first and second polarization patterns permanently formed therein, wherein said first polarization pattern corresponds to and is spatially aligned with said first pixel pattern so as to impart a first polarization state P1 to said first pixel pattern, and wherein said second polarization pattern corresponds to and is spatially aligned with said second pixel pattern so as to impart a second polarization state P2 to said second pixel pattern, such that said second polarization pattern is different than said first polarization P1.

27. The method of claim 24, wherein said set of vector quantities comprises a set of x and y coordinates.

* * * * *